United States Patent [19]

Waterman et al.

[11] Patent Number: 5,334,231
[45] Date of Patent: Aug. 2, 1994

[54] PAIRED RETAINING CLIPS FOR GAS FURNACE FILTER WIRE

[75] Inventors: Timothy J. Waterman, Carmel; Paul J. Otts, Plainfield, both of Ind.

[73] Assignee: Carrier Corporation, Syracuse, N.Y.

[21] Appl. No.: 143,449

[22] Filed: Oct. 26, 1993

[51] Int. Cl.$^5$ .............................................. B01D 46/00
[52] U.S. Cl. ........................................ 55/493; 55/501; 55/504
[58] Field of Search ............... 55/490, 493, 501, 504, 55/509

[56] References Cited

U.S. PATENT DOCUMENTS

| | | | |
|---|---|---|---|
| 2,074,294 | 3/1937 | Woodruff | 55/493 |
| 3,093,401 | 6/1963 | Hagendoorn | 55/493 X |
| 3,823,533 | 7/1974 | Alverson et al. | 55/493 |

Primary Examiner—Charles Hart

[57] ABSTRACT

A filter retaining device for a furnace having a casing and requiring a filter includes a filter retaining wire for securing the filter over an opening provided in the casing. The retaining device also includes a latch clip and a retainer clip which are each insertable through a corresponding hole in the furnace casing. One end of the filter wire is moveably secured by the retainer clip. The other end of the filter wire has a U-shape formed therein so that it can be easily snapped into and out of the latch clip. Each clip has a pair of flexible barbed detentes so that it may be securely snapped into its corresponding hole.

15 Claims, 4 Drawing Sheets

PAIRED RETAINING CLIPS FOR GAS FURNACE FILTER WIRE

BACKGROUND OF THE INVENTION

1. Field of the Invention

This invention relates in general to gas furnaces and, in particular, to a latchable filter retaining mechanism for a furnace filter. More specifically, but without restriction to the particular embodiment hereinafter described in accordance with the best mode of practice, this invention relates to paired retaining clips, each securely insertable through a corresponding hole in the furnace casing and enabled to receive an end of a filter wire to retain the filter within the furnace.

2. Discussion of the Prior Art

Gas furnaces typically include a primary heat exchanger positioned adjacent a burner box containing burners. During operation of the furnace, a blower moves circulating air over the heat exchanger to produce heated air that is directed to a desired location. Circulating air is supplied from an air duct, though an opening in the furnace casing, into an area proximate the furnace blower. A filter is typically situated over the opening between the air duct and the blower to filter the incoming circulating air.

Gas is supplied to the burner box by a gas manifold having orifices that direct the gas into the burners. The gas exiting the burners is ignited by an ignitor provided in the burner box. The burners allow combustion of the gas as well as direct heated flue gas into the heat exchanger. The typical heat exchanger includes cells with a channel or pass formed in each cell to direct the flow of flue gas produced by combustion. These cells are positioned side by side in a parallel manner and are provided with a predetermined spacing to allow the circulating blower air to flow around the cells. The blower air is thus heated by convection as it circulates over the cells.

A sheet metal panel or cell panel having burner target plates is typically provided to position the burner box relative to the inlet side of the cells contained in the heat exchanger. An inducer having a motor and fan is typically mounted on the discharge side of the heat exchanger. The inducer is activated to induce a flow of flue gas through the heat exchanger and into vent piping so that the flue gas may be vented to a location exterior to the furnace.

The residential heating industry has advanced with the advent of condensing gas furnaces. These furnaces typically included a primary heat exchanger as well as a condensing heat exchanger. A blower in these condensing furnaces similarly provides circulating air flow over both heat exchangers to produce heated air that may be directed to a desired location by a system of duct-work and registers. These condensing gas furnaces also require a filter filtering any airborne particulate matter carried by the incoming circulating air.

In such condensing furnaces, both the primary heat exchanger and the condensing heat exchanger include cells with a channel or pass formed therein to direct the flow of flue gas produced by combustion. These cells in both the primary and secondary heat exchangers are positioned side by side in a parallel manner and are provided with a predetermined spacing to allow circulating blower air to flow around both groups of heat exchanger cells. Gas is similarly provided to the condensing furnace by a gas manifold having orifices that direct the gas into burners contained in a burner box. The burner box is secured to the inlet side of the primary heat exchanger to align the discharge end of the burners with the inlet ports of the primary heat exchanger cells. The gas is ignited by an ignitor as it exits the burners contained in the burner box. The heated flue gas produced by combustion is then directed into the primary heat exchanger cells.

The condensing heat exchanger of the furnace is configured in a similar manner to its primary heat exchanger. A series of side by side condensing cells is provided. Each of these condensing cells has an inlet port for receiving flue gas discharged from the primary heat exchanger. The inlet ports of the condensing heat exchanger cells are aligned and secured in a sheet metal panel forming the inlet side of the condensing heat exchanger. The inlet side of the condensing heat exchanger is fluidly connected to the discharge side of the primary heat exchanger by a coupling box. The condensing cells function to exchange heat with the clean filtered circulating air and to condense water vapor out of the products of combustion contained in the flue gas. This condensate drains from the condensing cells into a collector box provided on the discharge side of the condensing heat exchanger. The collector box extends through the cell panel below the burner box and includes tubing to further drain the condensate from the box into drain piping. The collector box is provided with an opening to which the intake side of an inducer in fluidly secured. The inducer in the condensing furnace induces the flow of heated flue gas through the cells in both the primary and condensing heat exchangers.

With recent advancements in the art, a commercially feasible condensing gas furnace having four possible installation orientations has been proposed by the assignee of the present invention. Such gas-fired furnaces are known in the art as multi-poise condensing furnaces and are disclosed, for example, in the copending, commonly assigned U.S. patent application Ser. No. 08/089,697, entitled "Multi-Poised Condensing Furnace". These multi-poise furnaces are installable with either an upflow, downflow, horizontal-right flow, or horizontal-left flow orientation. They include design features which allow the furnace to function properly and just as efficiently in any one of these four possible installation orientations. One such feature results in proper drainage of condensate from the condensing heat exchanger cells into the collector box irrespective of the selected installation orientation. To accommodate the multi-poise furnace, the inducer employed therein features two optional discharge ports. Depending on the installation orientation, one of the two inducer discharge ports is selected to be connected to the vent piping while the other unused port is capped with an air-tight seal.

All of the above discussed furnaces require a filter for filtering undesired airborne particles from the incoming circulating air before the air is introduced to the furnace blower. Prior hereto, however, there has not been proposed a simple yet effective retaining mechanism capable of accommodating the various possible filter locations and orientations of a filter in a multi-poise furnace while also being capable of accommodating the filter of any one of a number of other different furnaces.

OBJECTS AND SUMMARY OF THE INVENTION

It is, therefore, an object of the present invention to improve gas furnaces.

Still another object of the present invention is to enable a gas furnace to releasably retain a filter therein.

Yet a further object of the present invention is to outfit a gas furnace with a latchable retaining mechanism to releasably secure a filter in a desired location within the furnace while eliminating protruding screw heads from the exterior of the furnace casing.

It is a further object of the present invention to enable a multi-poise gas furnace to releasably retain therein a filter in any one of a number of possible locations and orientations.

An additional object of the present invention is to utilize a latchable retaining mechanism in a gas furnace to retain a filter in a desired location.

It is still a further object of the present invention to reduce the assembly time required to outfit a furnace with a latchable retaining mechanism to releasably secure a filter in a desired location within the furnace.

These and other objects are attained in accordance with the present invention wherein there is provided a filter retaining device for a furnace having a casing for housing internal components and requiring a filter for filtering incoming circulation air. The casing is provided with an opening to receive the circulating air from duct-work connected thereto while the filter is secured over the furnace opening by the device of the present invention. In accordance with one aspect of the present device, a filter wire for securing the filter over the casing opening is provided so that incoming circulating air is filtered of airborne particulate matter prior to entering the casing.

According to another aspect of this invention, the furnace casing is provided with a retainer clip for moveably securing relative to the casing one end of the filter wire. The retainer clip is inserted through a hole formed adjacent one side of the casing opening to position the retainer clip in a desired location. In association with the retainer clip there is provided a latch clip for releasably securing the other end of the filter wire to the casing. The latch clip is inserted through a hole positioned adjacent another side of the casing opening so that when the filter is placed over the casing opening, the filter wire can be moved into position against the filter and the free end of the wire snapped into the latch clip to secure the filter in place.

In the preferred embodiment of the present invention, the base side of the head of each clip is provided with a raised rectangular member. The corresponding holes are also rectangular so that when a respective clip is inserted into its corresponding hole, the boss engages the hole to thereby prevent the clip from rotating within the hole.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing with like reference numerals indicating like components throughout, wherein.

DETAILED DESCRIPTION OF A PREFERRED EMBODIMENT

Figure 1:
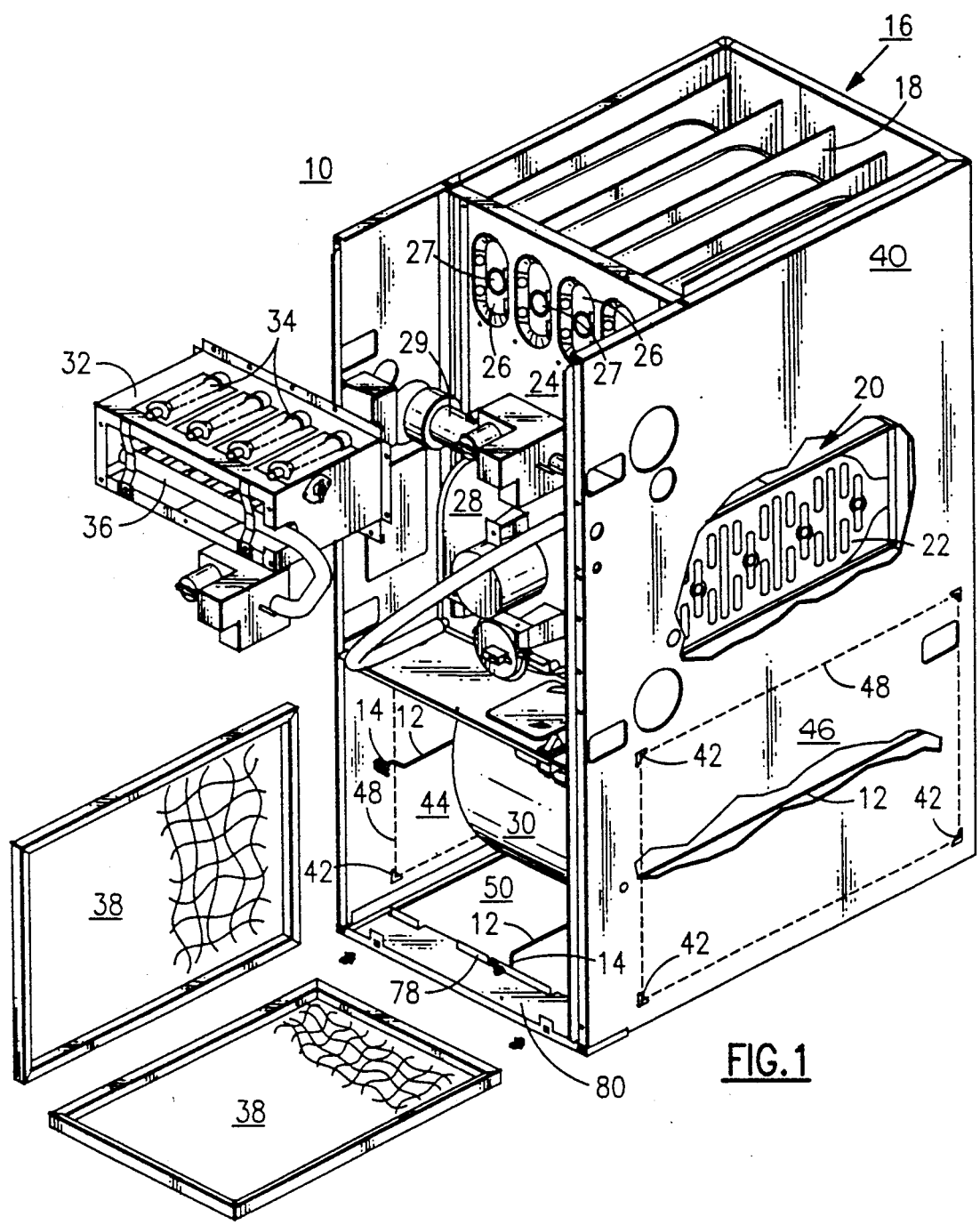
FIG. 1 is a partially broken away perspective view of a multi-poise condensing gas furnace employing the filter retaining wire and clips of the present invention.

Referring now to the drawing and initially to FIG. 1, there is shown a multi-poise condensing gas furnace 10 incorporating a filter retaining wire 12 with a U-shaped latching end or handle segment 14 in accordance with the present invention. The filter wire 12 is shown in conjunction with a multi-poise furnace only by way of illustration and may be effectively employed in any gas furnace requiring filters. Additionally, all directional references used herein are taken relative to the upflow installation orientation shown in FIG. 1, it being understood that in different installation orientations of the multi-poise furnace 10, relative directional references may be inverted, reversed, or otherwise reorientated.

The multi-poise furnace 10 includes a primary heat exchanger 16 which includes primary heat exchanger cells 18. The furnace 10 also includes a condensing heat exchanger 20 provided with condensing heat exchanger cells 22. A cell panel 24 includes a number of burner target plates 26 formed on the inlet side of the primary heat exchanger 16. Each of the burner target plates 26 includes an inlet 27 corresponding to an inlet port in each primary heat exchanger cell 18 contained within the heat exchanger 16. An inducer 28 is provided on the front side of the furnace and is employed to induce the flow of heated flue gas and combustion products through the heat exchanger cells 18 and 22. The inducer 28 includes an inducer discharge port 29 which is connected to venting pipe (not shown) to vent the flue gas to an exterior location. The furnace 10 is also provided with a blower 30 for moving circulating air over the heat exchanger cells 18 and 22 so that the circulating air may be heated by convection. A burner box 32 is mounted to the inlet side of the primary heat exchanger 16 with a gasket positioned therebetween to provide a tight seal between the box 32 and the cell panel 24. The burner box 32 includes individual burners 34 which are provided gas through a gas manifold 36.

The multi-poise condensing furnace 10, as represented in FIG. 1, is available in large and small capacity sizes. The small capacity size requires only a single filter 38 while the large capacity furnace requires two filters 38 with a filter wire 12 for each filter. FIG. 1 shows two filters 38 and three filter retaining wires 12 for purposes of complete illustration. The filter or filters 38 are provided in the furnace 10 to clean incoming circulating air of airborne particulate matter prior to entering the furnace and the blower 30.

The internal components of the furnace 10 are housed within a sheet metal casing 40 and the left and right sides of the casing 40 are provided with pre-punched knockouts 42. During installation of the multi-poise furnace 10, the installer will decide which of the four possible installation orientations is most appropriate in the particular situation. Once the installation orientation is determined, the installer then ascertains the direction duct-work is or will be brought to the furnace 10. To accommodate the incoming duct-work, the pre-punched knockouts 42 may be removed from the casing 40 by means of a flat-tip screwdriver or other tool. A left side opening 44 or a right side opening 46 may then be formed in the casing 40 by cutting the sheet metal between the four pre-punched knockouts as depicted in FIG. 1 by dashed lines 48.

In accordance with the multi-poise aspect of the furnace 10, the casing 40 is provided with three potential openings for receiving circulating air from the duct-work. These openings include the left side opening 44, the right side opening 46 and a bottom opening 50. Depending upon the installation orientation, the single filter 38 and wire 12 for the smaller capacity furnace are located in one of the three possible openings 44, 46, or 50. In the larger capacity furnaces, the two filters 38 and corresponding retaining wires 12 are placed, respectively, in two of the three possible filter openings. For example, when the larger capacity furnace is in the upflow orientation shown in FIG. 1, the installer may decide to use both of the side openings 44 and 46 or one of the side openings and the bottom opening 50 so as to provide the required amount of incoming air flow.

Figure 2:
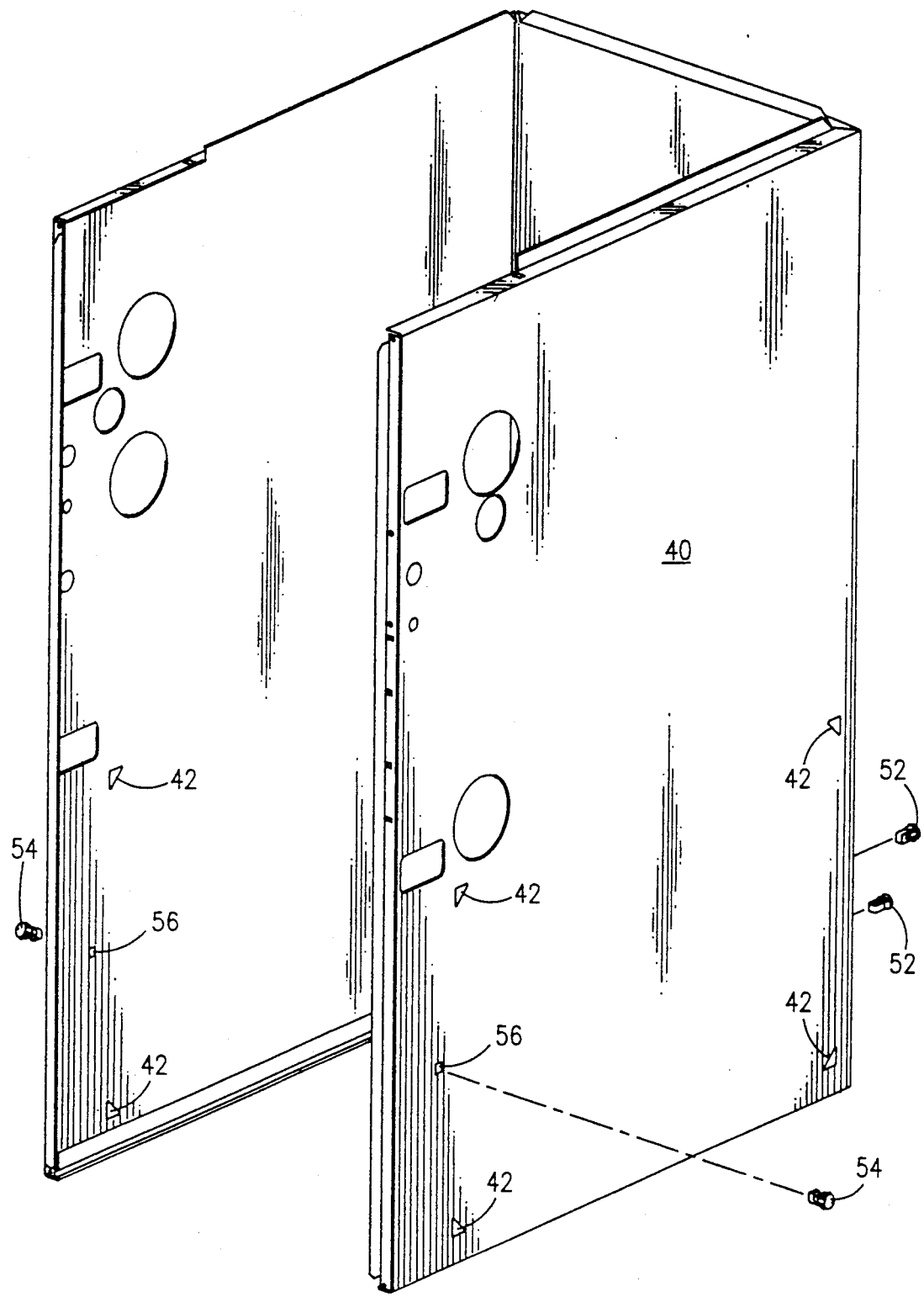
FIG. 2 is a perspective view of the furnace casing of FIG. 1 showing the present retaining clips prior to assembly with the casing.
Figure 3A:
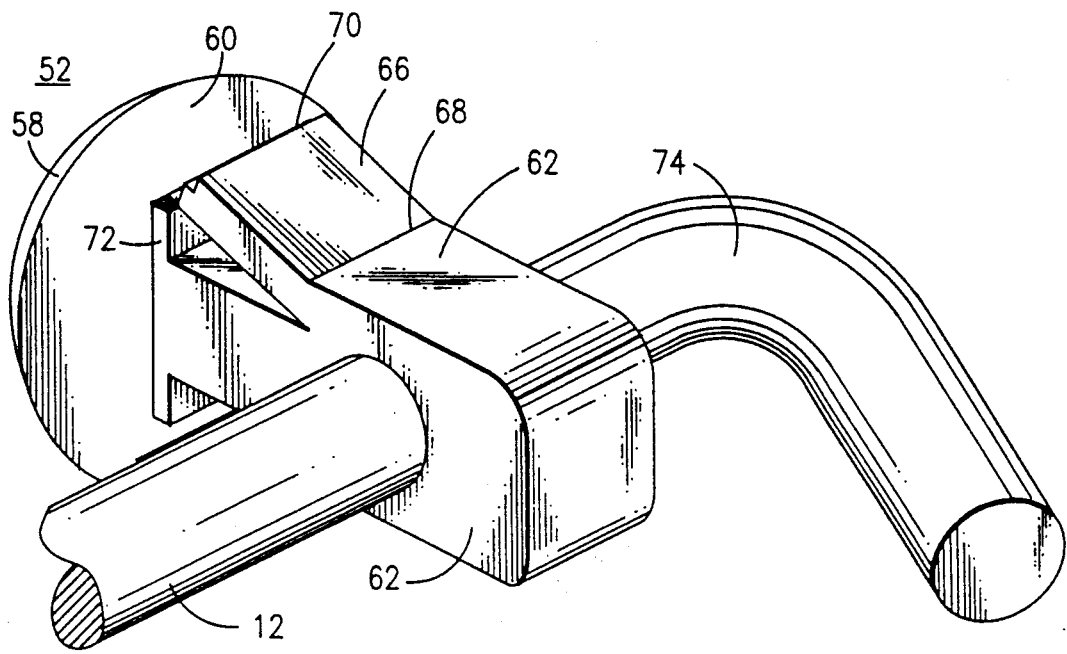
FIGS. 3A and 3B are perspective and side elevational views, respectively, of a retainer clip in accordance with the present invention.
Figure 3B:
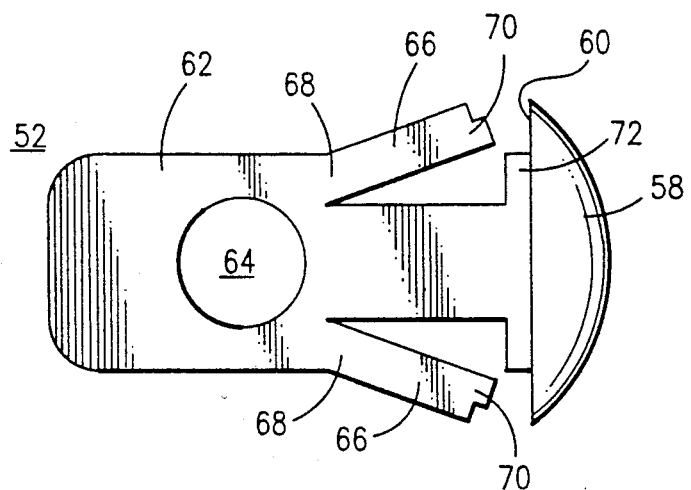

With reference to FIG. 2, there is shown a pair of retainer clips 52 and a corresponding pair of latch clips 54 in accordance with the present invention. The furnace casing 40 includes rectangular holes 56 for receiving the clips 52 and 54. As can be seen in FIGS. 3A and 3B, the retainer clip 52 includes a head portion 58 having on one side thereof a flat base 60. The head 58 is preferably smoothly rounded without sharp edges or screwdriver slots. The clip 52 also includes an elongated body segment 62 having an aperture 64 formed therein. The body segment 62 is formed generally perpendicular to the flat base 60. A pair of opposing flexible barbed detentes 66—66 are formed into the body segment 62. Each barbed detent 66 has a proximal end 68 integrally formed into the body segment 62 and an opposing distal end 70 which is proximate to the flat base 60. The flat base 60 of the head portion 58 also includes a raised rectangular member 72. The rectangular member 72 corresponds in size and shape to the rectangular holes 56.

The retainer clip 52 is made from a suitable resilient plastic material such as ABS, nylon, or polycarbonate. In this manner, when the clip 52 is inserted into a corresponding rectangular hole 56, the barbed detentes 66—66 will flex inwardly toward the body segment 62 to allow the body segment 62 to fully penetrate through the hole 56. As the barbed detentes clear the hole 56, the rectangular member 72 will engage the hole 56 and the paired flexible barbed detentes 66—66 will snap outwardly to pin the casing between the flat base 60 and the distal ends 70 of the barbed detentes. Once inserted, rectangular member 72 prevents rotation of the clip within a corresponding rectangular hole 56. In the preferred embodiment of the present invention, each detent 66 terminates with its distal end 70 slightly in front of the rectangular member 72 so that the detents 66—66 have sufficient clearance to snap outwardly when the flat base 60 is in contact with the surface of the casing immediately adjacent a corresponding rectangular hole 56. Lastly as shown in FIG. 3A, the filter wire 12 includes a J-shaped distal end 74 which will be further described below.

Figure 4A:
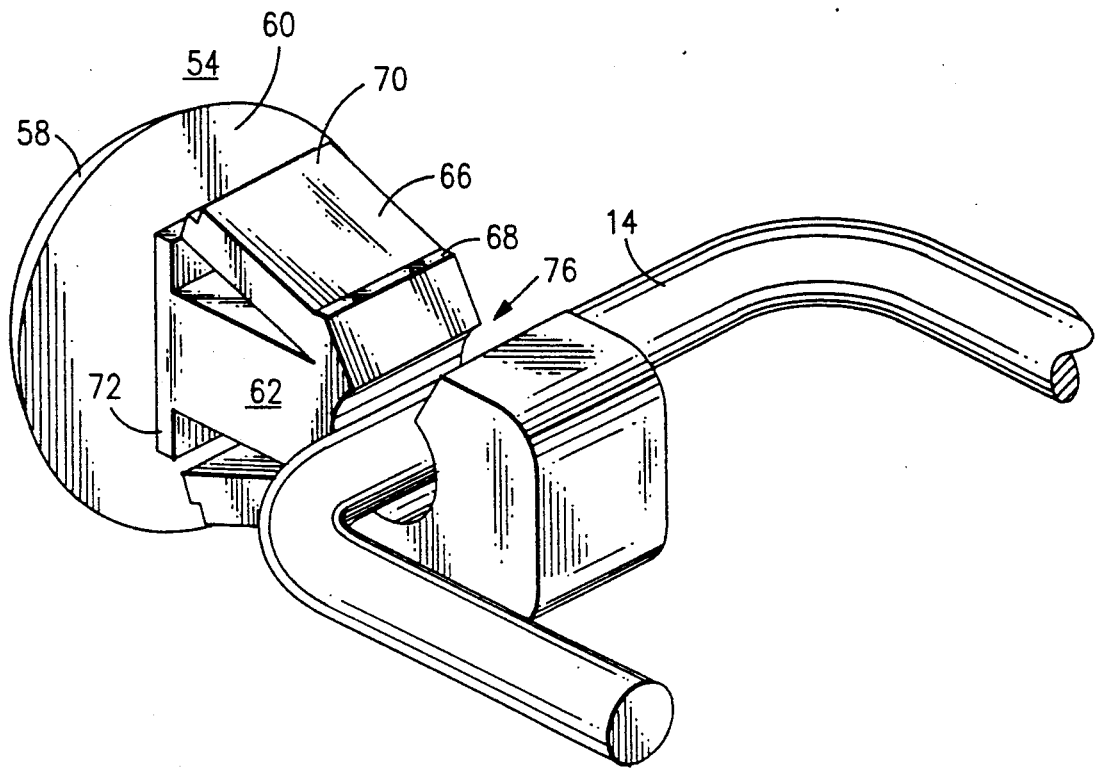
FIGS. 4A and 4B are perspective and side elevational views, respectively, of a latch clip in accordance with the present invention, FIG. 4A showing one end of the filter wire secured within the clip.
Figure 4B:
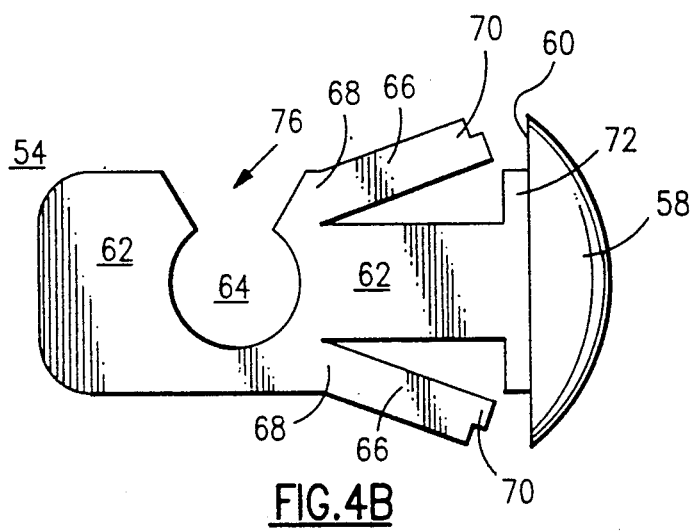

As seen in the FIGS. 4A and 4B, the latch clip 54 is similar in form to the retainer clip 52 in that the latch clip 54 includes a head portion 58, a flat base 60, and an elongated body segment 62 with an aperture 64 formed therein. The latch clip 54 similarly includes a rectangular member 72 and a pair of opposing flexible barbed detentes 66—66 each having a proximal end 68 and a distal end 70 which all function in the same manner as like components of the retainer clip 52. The latch clip 54 is also formed of a suitable resilient plastic material so that it may be snapped into a corresponding rectangular hole 56 in a similar manner as that described with reference to the retainer clip 52. Unlike the retainer clip 52, however, the latch clip 54 further includes a V-shaped notch 76 formed in the side of the elongated body segment 62 to give open access to the aperture 64. As shown in FIG. 4A, the V-notch 76 and aperture 64 cooperate to allow the U-shaped latching end 14 of the filter wire 12 to be releasably snapped into and out of the latch clip 54.

To outfit the furnace 10 in accordance with the present invention, a retainer clip 52 is inserted into a corresponding rectangular hole 56 in the back side of the furnace casing 40 as illustrated in FIG. 2. A latch clip 54 is then inserted into one of the sides of the casing 40. The J-shaped distal end 74 of the filter wire 12 is then hooked through the aperture 64 of the retainer clip 52 and adjusted so that a straight segment of the filter wire 12 proximate the J-shaped end 74 is situated within the aperture 64 as shown in FIG. 3A. In accordance with one aspect of the present invention, the filter wire 12 is of a predetermined length so that when the straight segment of the wire 12 adjacent the distal J-shaped end 74 is positioned within the aperture 64 of the retainer clip 52, the U-shaped latching end 14 of the filter wire 12 is centrally positioned relative to a corresponding latch clip 54 as shown in FIG. 4A. In this manner, the filter wire 12 is assembled in the furnace 10 and secured to the casing 40 by the clips 52 and 54. The wire and clip assembly is thus in condition to receive the filter 38.

The U-shaped latching end 14 may be easily snapped out of the latch clip 52, and the filter wire 12 flexed away from the casing 40 so that the filter 38 may be slid along the casing 40 between the wire and the casing with the filter wire acting as a guide for directing the filter into position. As shown in FIG. 1, the two potential side openings 44 and 46 require both a retainer clip 52 and a latch clip 54 while the bottom opening 50 requires only a retainer clip 52. The U-shaped latching end 14 of the filter wire 12, when situated in the bottom opening 50, is latched into a tab portion 78 of a base panel 80 as shown in FIG. 1.

In the upflow installation orientation of the furnace 10 as shown in FIG. 1, the retainer clips 52 are inserted into their corresponding rectangular holes 56 so that an axis running perpendicularly through the aperture 64 is horizontal. The corresponding latch clips 54 in the left and right sides 44 and 46 of the casing are inserted so that the V-shaped notch 76 is directed upwardly. In the down flow installation orientation, the retainer clips 52 are inserted as above, while the latch clips 74 are inserted 180 degrees of rotation relative to the upflow orientation resulting, as above, with the V-shaped notch 76 directed upwardly. In the left flow and right flow installation orientations, the retainer clips 52 are inserted rotated 90 degrees relative to the orientation shown in FIG. 1. Again in these two installation orientations, the retainer clips 52 is positioned and inserted so that the perpendicular axis through the aperture 64 is horizontal. This orientation will allow the J-shaped end 74 of the filter wire 12 to be easily hooked into the aperture 64. In the left flow and right flow installation orientations, the latch clip 54 is inserted so that the V-shaped notch 76 faces to either the left or right rather than toward the front or back.

The filter clips 52 and 54 thus enable a filter wire 12 to securely position a filter in the casing 40 while also enabling proper orientation of the filter wire 12 when used in conjunction with a multi-poise furnace.

While this invention has been described in detail with reference to a certain preferred embodiment, it should be appreciated that the present invention is not limited to that precise embodiment. Rather, in view of the present disclosure which describes the best mode for practicing the invention, many modifications and variations would present themselves to those of skill in the art without departing from the scope and spirit of this invention, as defined in the following claims.

What is claimed is:

1. A filter retaining device for a furnace having a casing for housing components including a filter, the casing having an opening formed therein for receiving circulating air, said device comprising:
    a filter wire for securing the filter over the casing opening so that incoming circulating air is filtered of airborne particulate matter prior to entering the casing;
    retainer means for moveably securing a first end of said filter wire relative to the casing, said retainer means being insertable through a first hole positioned adjacent one side of the casing opening; and
    latch means for releasably securing a second end of said filter wire to the casing, said latch means insertable through a second hole positioned adjacent another side of the casing opening so that when the filter is placed over the casing opening, said filter wire may be moved into position against the filter and said second end of the wire snapped into said latch means to secure the filter.

2. The device according to claim 1 wherein said retainer means includes a retainer clip having:
    a head portion being smoothly rounded on one side with a flat base on the other side;
    an elongated body segment extending outwardly from the base of said head portion and being generally perpendicular thereto, said elongated body segment having an aperture for receiving therethrough said first end of said filter wire; and
    a pair of opposing flexible barbed detentes associated with the body segment, each barbed detent having a proximal end integrally formed into the body segment and extending away therefrom to a distal end being proximate said flat base so that when said retainer clip is inserted into said first hole in the casing, the detentes will flex inwardly toward the body segment and then snap outwardly as said flat base contacts the casing thereby pinning the casing between the base and the distal ends of the barbed detentes.

3. The device according to claim 1 wherein said latch means includes a latch clip having:
    a head portion being smoothly rounded on one side with a flat base on the other side;
    an elongated body segment extending outwardly from the base of said head portion and being generally perpendicular thereto, said elongated body segment having an aperture with a V-notch opening for releasably receiving said second end of said filter wire; and
    a pair of opposing flexible barbed detentes associated with the body segment, each barbed detent having a proximal end integrally formed into the body segment and extending away therefrom to a distal end being proximate said flat base so that when said retainer clip is inserted into said first hole in the casing, the detentes will flex inwardly toward the body segment and then snap outwardly as said flat base contacts the casing thereby pinning the casing between the base and the distal ends of the barbed detentes.

4. The device according to claim 1 wherein said first end of said filter wire is J-shaped and said second end thereof includes a U-shaped handle segment, said filter wire being of a predetermined length so that when the J-shaped end is secured within said retainer means, the handle segment is positioned to be snapped into and out of said latch means.

5. The device according to claim 2 wherein said retainer clip further includes means for preventing the clip from rotating within said first hole when the clip is inserted into the hole.

6. The device according to claim 5 wherein said first hole in the casing is rectangular and said means for preventing said retainer clip from rotating includes a raised rectangular member corresponding in shape to the first rectangular hole, the rectangular member being centrally formed on the base of said retainer clip with said elongated body segment extending therefrom so that when the clip is inserted into the first hole, the rectangular member engages the hole in a close fit to prevent rotation of the clip whereby said retainer clip is insertable into the hole with a predetermined fixed orientation.

7. The device according to claim 3 wherein said latch clip further includes means for preventing the clip from rotating within said second hole when the clip is inserted into the hole.

8. The device according to claim 7 wherein said second hole in the casing is rectangular and said means for preventing said latch clip from rotating includes a raised rectangular member corresponding in shape to the second rectangular hole, the rectangular member being centrally formed on the base of said latch clip with said elongated body segment extending therefrom so that when the clip is inserted into the second hole, the rectangular member engages the hole in a close fit to prevent rotation of the clip whereby said latch clip is insertable into the hole with a predetermined fixed orientation.

9. A device for securing a filter wire on a furnace casing having an opening formed therein for receiving circulating air, said device comprising:
    retainer means for moveably securing a first end of the filter wire relative to the casing, said retainer means being insertable through a first hole positioned adjacent one side of the casing opening; and
    latch means for releasably securing a second end of the filter wire to the casing, said latch means insertable through a second hole positioned adjacent another side of the casing opening so that when a filter is placed over the casing opening, said filter wire may be moved into position against the filter and said second end of the wire snapped into said latch means to secure the filter against the casing.

10. The device according to claim 9 wherein said retainer means includes a retainer clip having:
- a head portion being smoothly rounded on one side with a flat base on the other side;
- an elongated body segment extending outwardly from the base of said head portion and being generally perpendicular thereto, said elongated body segment having an aperture for receiving therethrough said first end of the filter wire; and
- a pair of opposing flexible barbed detentes associated with the body segment, each barbed detent having a proximal end integrally formed into the body segment and extending away therefrom to a distal end being proximate said flat base so that when said retainer clip is inserted into said first hole in the casing, the detentes will flex inwardly toward the body segment and then snap outwardly as said flat base contacts the casing thereby pinning the casing between the base and the distal ends of the barbed detentes.

11. The device according to claim 9 wherein said latch means includes a latch clip having:
- a head portion being smoothly rounded on one side with a flat base on the other side;
- an elongated body segment extending outwardly from the base of said head portion and being generally perpendicular thereto, said elongated body segment having an aperture with a V-notch opening for releasably receiving said second end of the filter wire; and
- a pair of opposing flexible barbed detentes associated with the body segment, each barbed detent having a proximal end integrally formed into the body segment and extending away therefrom to a distal end being proximate said flat base so that when said retainer clip is inserted into said first hole in the casing, the detentes will flex inwardly toward the body segment and then snap outwardly as said flat base contacts the casing thereby pinning the casing between the base and the distal ends of the barbed detentes.

12. The device according to claim 10 wherein said retainer clip further includes means for preventing the clip from rotating within said first hole when the clip is inserted into the hole.

13. The device according to claim 12 wherein said first hole in the casing is rectangular and said means for preventing said retainer clip from rotating includes a raised rectangular member corresponding in shape to the first rectangular hole, the rectangular member being centrally formed on the base of said retainer clip with said elongated body segment extending therefrom so that when the clip is inserted into the first hole, the rectangular member engages the hole in a close fit to prevent rotation of the clip whereby said retainer clip is insertable into the hole with a predetermined fixed orientation.

14. The device according to claim 11 wherein said latch clip further includes means for preventing the clip from rotating within said second hole when the clip is inserted into the hole.

15. The device according to claim 14 wherein said second hole in the casing is rectangular and said means for preventing said latch clip from rotating includes a raised rectangular member corresponding in shape to the second rectangular hole, the rectangular member being centrally formed on the base of said latch clip with said elongated body segment extending therefrom so that when the clip is inserted into the second hole, the rectangular member engages the hole in a close fit to prevent rotation of the clip whereby said latch clip is insertable into the hole with a predetermined fixed orientation.

* * * * *